No. 660,958. Patented Oct. 30, 1900.
I. HOGELAND.
CAR WHEEL.
(Application filed May 16, 1900.)
(No Model.)
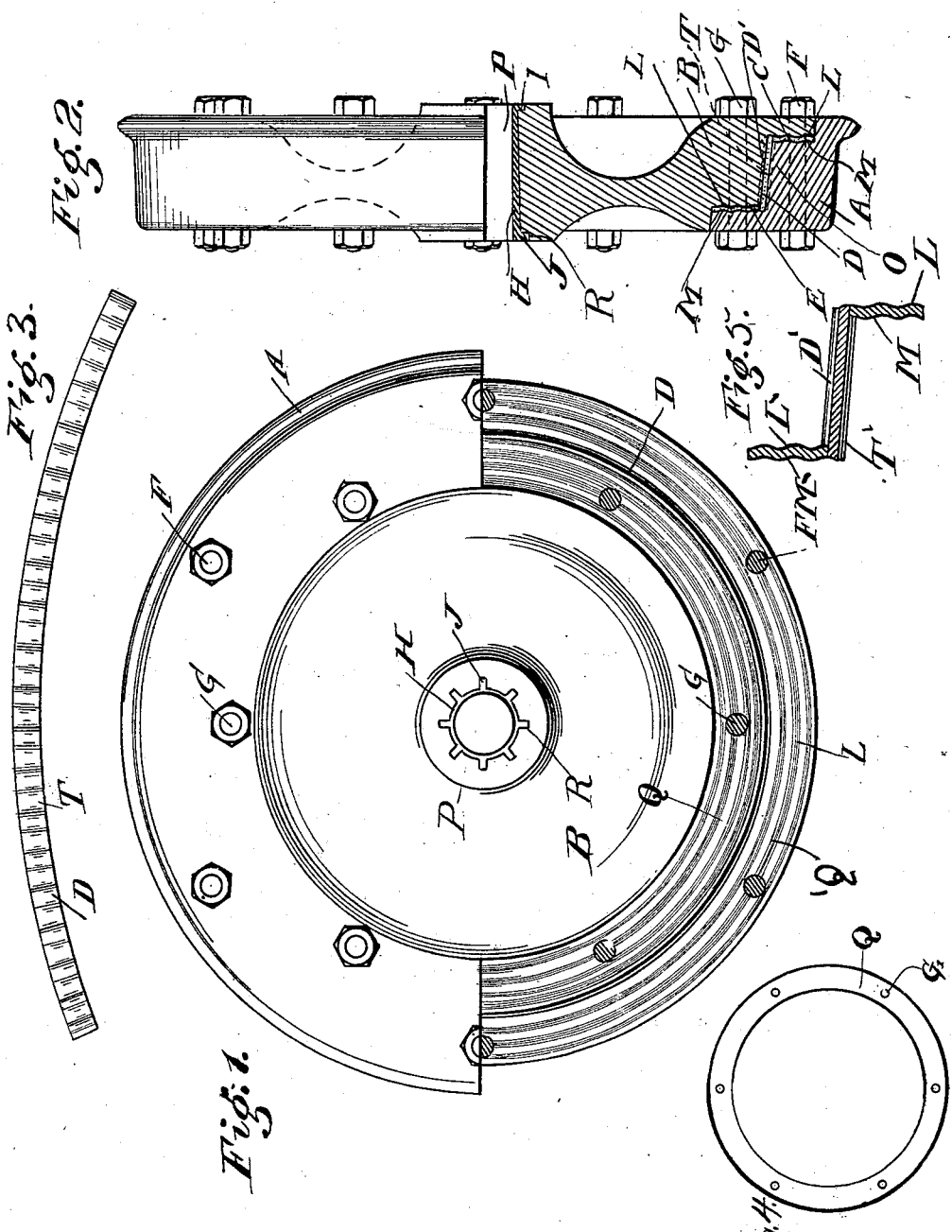
Witnesses:
C. E. Burnap
James Baird
Inventor:
Israel Hogeland.
THE NORRIS PETERS CO., PHOTO-LITHO., WASHINGTON, D. C.

United States Patent Office.

ISRAEL HOGELAND, OF INDIANAPOLIS, INDIANA, ASSIGNOR OF TWO-THIRDS TO CHARLES E. KREGELO AND ALBERT W. WISHARD, OF SAME PLACE.

CAR-WHEEL.

SPECIFICATION forming part of Letters Patent No. 660,958, dated October 30, 1900.

Application filed May 16, 1900. Serial No. 16,840. (No model.)

*To all whom it may concern:*

Be it known that I, ISRAEL HOGELAND, a citizen of the United States, residing at Indianapolis, in the county of Marion, State of Indiana, have invented certain new and useful Improvements in Car-Wheels, of which the following is a description, reference being had to the accompanying drawings and to the letters of reference marked thereon.

This invention relates to a car-wheel such as shown in my Patent No. 643,134, dated February 13, 1900.

The object of the invention is to improve the meeting faces of the wheel center and tire, so that the said two parts will be more firmly held together. This object is accomplished by the mechanism shown in the accompanying drawings, in which—

Figure 1 is a side elevation of my improved car-wheel, partly in section. Fig. 2 is an edge view, partly in section. Fig. 3 is a plan of the strip from which the middle packing is formed, with the bushing in place. Fig. 4 shows one of the packing-rings. Fig. 5 is an enlarged detail sectional view showing the relative arrangement of the three packing-rings.

A designates the wheel-tire, and B the wheel-center, and F G the securing-bolts. The adjacent faces of the tire and center are stepped or rabbeted and interlock, as is best shown in Fig. 2. The center B has two radial faces L L', between which is arranged the tapering or inclined central face D, as in my aforesaid patent. In the present instance, however, these radial faces are each provided with a series of grooves or corrugations D', concentric with the wheel-axis, and the central face D is transversely grooved or corrugated. The three corresponding internal faces M M' $D^2$ of the tire B are corrugated or grooved in like manner to the faces L L' D and the two sets of corrugations are arranged to interlock—that is, the grooves on one register with the ribs or projections on the other.

C C designate the radial packing-rings, of any suitable fabric, such as paper or other fibrous material, and are waterproof, so as to keep moisture from gaining access to the intermediate ring T, which is of greater width than the surface D, so as to overlap both rings C C, as clearly shown in Figs. 2 and 5. The corrugations on the tire and center will cause the rings to be forced therein when the nuts on the bolts F G are tightened or the tire is otherwise forced in place, so that the wheel center and tread will be perfectly cushioned, and the corrugations on the two will tend to hold them from slippage or movement one on the other, and thus assist in relieving the bolts from strain. The faces of the tire and center are both flush.

It will be seen that by the corrugations a greater extent of fibrous packing exists, and its disposition results in a decrease of noise. Moreover, the corrugations in the side packing-rings will serve to better prevent the entrance of moisture to the central packing. It will also be seen that the bolt-holes for the outer bolt F alternate with those for the inner bolts G, so as to avoid weakening the wheel, as would be the tendency if the two series of holes were in radial alinement. The two series of bolts are a material improvement over the single series of my patent.

What I claim is—

1. A car-wheel comprising a center having a stepped periphery, two of the faces of which at opposite sides of the central face are radial, and a tire having a stepped interior corresponding with the stepped periphery of the center; all of said mating faces being grooved or corrugated and spaced to receive packings or cushions between them; substantially as described.

2. A car-wheel comprising a center having a stepped periphery, the side surfaces being radial and the central surface being flared or tapered, a rim having its interior stepped to conform to the periphery of the center and all of said meeting faces being grooved or corrugated, and packings or cushions between the several corrugated faces; substantially as described.

3. A car-wheel comprising a center having a stepped periphery, two of the faces of which at opposite sides of the central face are radially disposed, a tire having a stepped interior corresponding with the stepped periphery of the center, all of said mating faces being grooved or corrugated and spaced to receive packings or cushions between them, and inner and outer alternately-arranged bolts passing through the wheel-sections at their radially-disposed portions; substantially as described.

In testimony whereof I affix my signature in presence of two witnesses.

ISRAEL HOGELAND.

Witnesses:
OTTO GRESHAM,
E. G. LANCASTER.